US009798997B2

United States Patent
Ito et al.

(10) Patent No.: US 9,798,997 B2
(45) Date of Patent: Oct. 24, 2017

(54) ARTICLE MANAGEMENT SYSTEM, ARTICLE MANAGEMENT APPARATUS AND METHOD FOR MANAGING ARTICLE

(71) Applicant: TOSHIBA TEC KABUSHIKI KAISHA, Shinagawa-ku, Tokyo (JP)

(72) Inventors: Kenji Ito, Tokyo (JP); Masami Yamanashi, Shizuoka (JP); Shinichi Kashiwagi, Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/017,872

(22) Filed: Feb. 8, 2016

(65) Prior Publication Data
US 2016/0232768 A1 Aug. 11, 2016

(30) Foreign Application Priority Data
Feb. 9, 2015 (JP) .................................. 2015-023539

(51) Int. Cl.
*G08B 13/24* (2006.01)
*G06Q 10/08* (2012.01)

(52) U.S. Cl.
CPC .............................. *G06Q 10/0833* (2013.01)

(58) Field of Classification Search
CPC .. H04W 4/023; G06Q 10/087; G06Q 10/0836
See application file for complete search history.

(56) References Cited

U.S. PATENT DOCUMENTS

| 6,184,789 | B1* | 2/2001 | Richley | G01S 1/70 340/571 |
| 8,909,136 | B1* | 12/2014 | Keshishi | H04B 7/26 340/539.11 |
| 2008/0111691 | A1* | 5/2008 | Lee | G06K 17/00 340/572.1 |
| 2011/0156907 | A1* | 6/2011 | Nagai | G06K 7/0008 340/572.1 |
| 2012/0194354 | A1* | 8/2012 | Kundmueller | G06Q 50/12 340/932.2 |

FOREIGN PATENT DOCUMENTS

JP   2008-152686   7/2008

\* cited by examiner

*Primary Examiner* — Nabil Syed
(74) *Attorney, Agent, or Firm* — Amin, Turocy & Watson LLP; Gregory Turocy

(57) ABSTRACT

An article management system comprises a transmitter for sending electric wave, a receiver for receiving the electric wave from the transmitter, an alarm for carrying out a notification operation in response to the input of a drive signal and an article management apparatus including an association module configured to associate the transmitter with the alarm corresponding to an article to be handed over to a user who has the transmitter on condition that the electric wave from the transmitter is being received by the receiver, and a determination-output module configured to determine whether or not a relative distance between the transmitter and the receiver becomes shorter than a specific distance on condition that the electric wave from the transmitter is being received by the receiver and to output the drive signal to the alarm which is associated with the transmitter if the relative distance is shorter than the specific distance.

9 Claims, 12 Drawing Sheets

| INTENSITY OF ELECTRIC WAVE (db) | DISTANCE (m) |
|---|---|
| A1 | B1 |
| A2 | B2 |
| A3 | B3 |
| A4 | B4 |
| A5 | B5 |
| ⋮ | ⋮ |

| TRANSMITTER ID | ALARM ID | DEPOSIT DATE AND TIME |
|---|---|---|
| C099 | D156 | YYYYMMDDhhmm |
| C123 | D058 | YYYYMMDDhhmm |
| C025 | D333 | YYYYMMDDhhmm |
| C087 | D027 | YYYYMMDDhhmm |
| C001 | D014 | YYYYMMDDhhmm |
| ⋮ | ⋮ | ⋮ |

FIG.5

| TRANSMITTER ID | RECORDED INTENSITY Am | DISTANCE Dn | DISPLAY FLAG F1 | NOTIFICATION FLAG F2 |
|---|---|---|---|---|
|  |  |  |  |  |
|  |  |  |  |  |
|  |  |  |  |  |
|  |  |  |  |  |
|  |  |  |  |  |

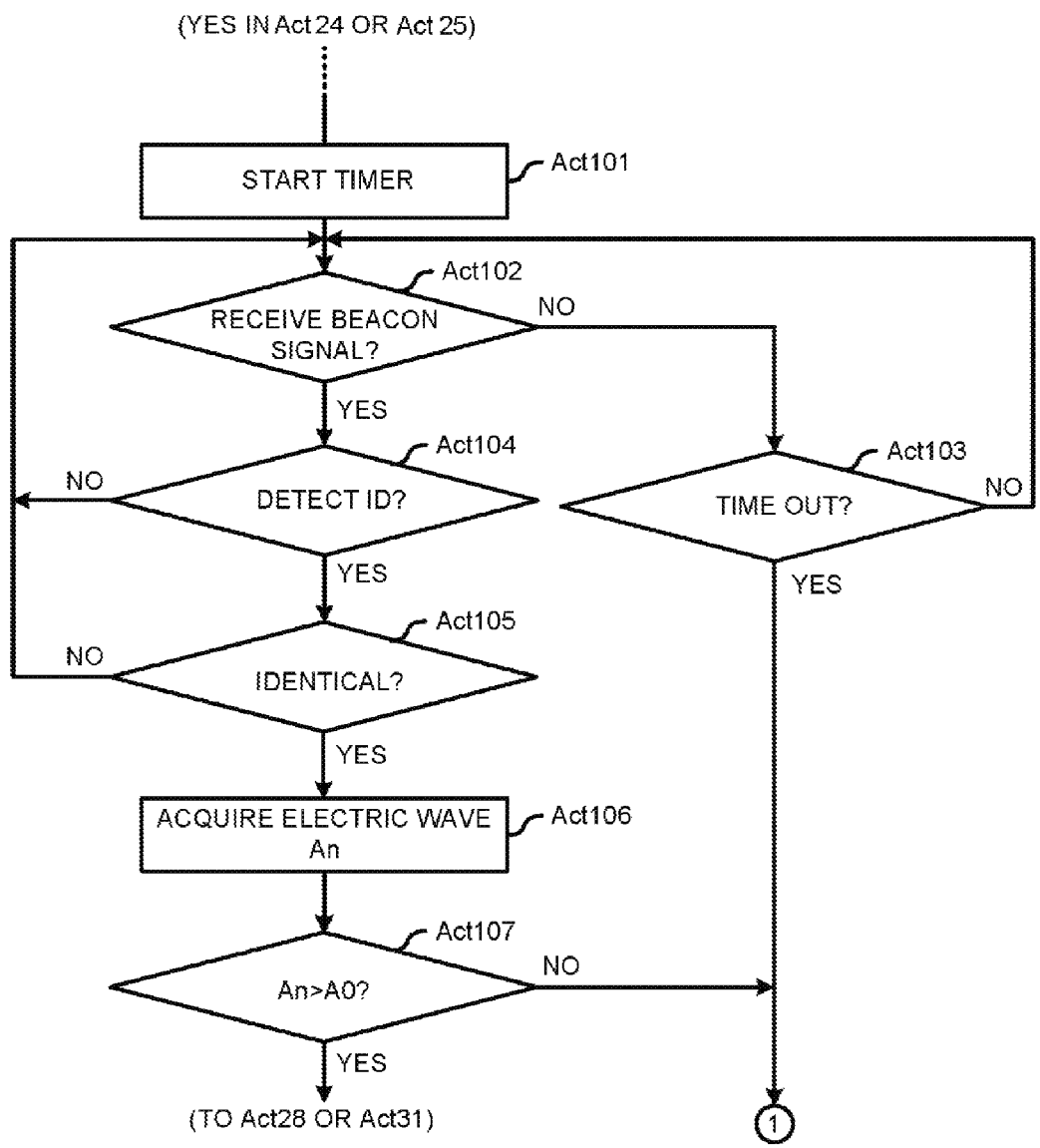

ARTICLE MANAGEMENT SYSTEM, ARTICLE MANAGEMENT APPARATUS AND METHOD FOR MANAGING ARTICLE

CROSS-REFERENCE TO RELATED APPLICATION

This application is based upon and claims the benefit of priority from Japanese Patent Application No. 2015-023539 filed Feb. 9, 2015, the entire contents of which are incorporated herein by reference.

FIELD

Embodiments described herein relate generally to an article management system, an article management apparatus for managing an article such as a baggage deposited by a user and an article management method for managing an article.

BACKGROUND

In an article checkroom at which baggage is kept as an article, for example, a person in charge looks for the baggage deposited by a user after the user who has deposited the baggage comes to the window. Thus, it takes time to hand over the baggage to the user and it is expected to be improved.

To avoid the foregoing problem, it is conceivable to develop a system in which a wireless device is used to shorten the time required for the delivery of baggage. However, even if this system is constructed, the time for the delivery of baggage cannot be shortened in a case in which the wireless device malfunctions.

DESCRIPTION OF THE DRAWINGS

FIG. 4 is a schematic diagram illustrating an association file;

FIG. 5 is a schematic diagram illustrating a tracking file;

FIG. 15 is a flowchart illustrating the main operations carried out in the deposit job according to a second embodiment.

DETAILED DESCRIPTION

In accordance with an embodiment, an article management system comprises a transmitter for sending an electric wave, a receiver for receiving the electric wave sent from the transmitter, an alarm for carrying out a notification operation in response to the input of a drive signal and an article management apparatus including an association module configured to associate the transmitter with the alarm which corresponds to an article to be handed over to a user who has the transmitter on condition that the electric wave sent from the transmitter is being received by the receiver, and a determination-output module configured to determine whether or not a relative distance between the transmitter and the receiver becomes shorter than a specific distance on condition that the electric wave sent from the transmitter is being received by the receiver and to output the drive signal to the alarm which is associated with the transmitter if the relative distance is shorter than the specific distance.

An embodiment of an article management system in which a wireless device is used to shorten the delivery time of an article to achieve the high efficiency of jobs is described below with reference to the accompanying drawings. According to the embodiment, the article management system constructed at an article checkroom where a user such as a traveler temporarily deposits his or her article such as a baggage (suitcase) is exemplified.

(First Embodiment)

Figure 1:
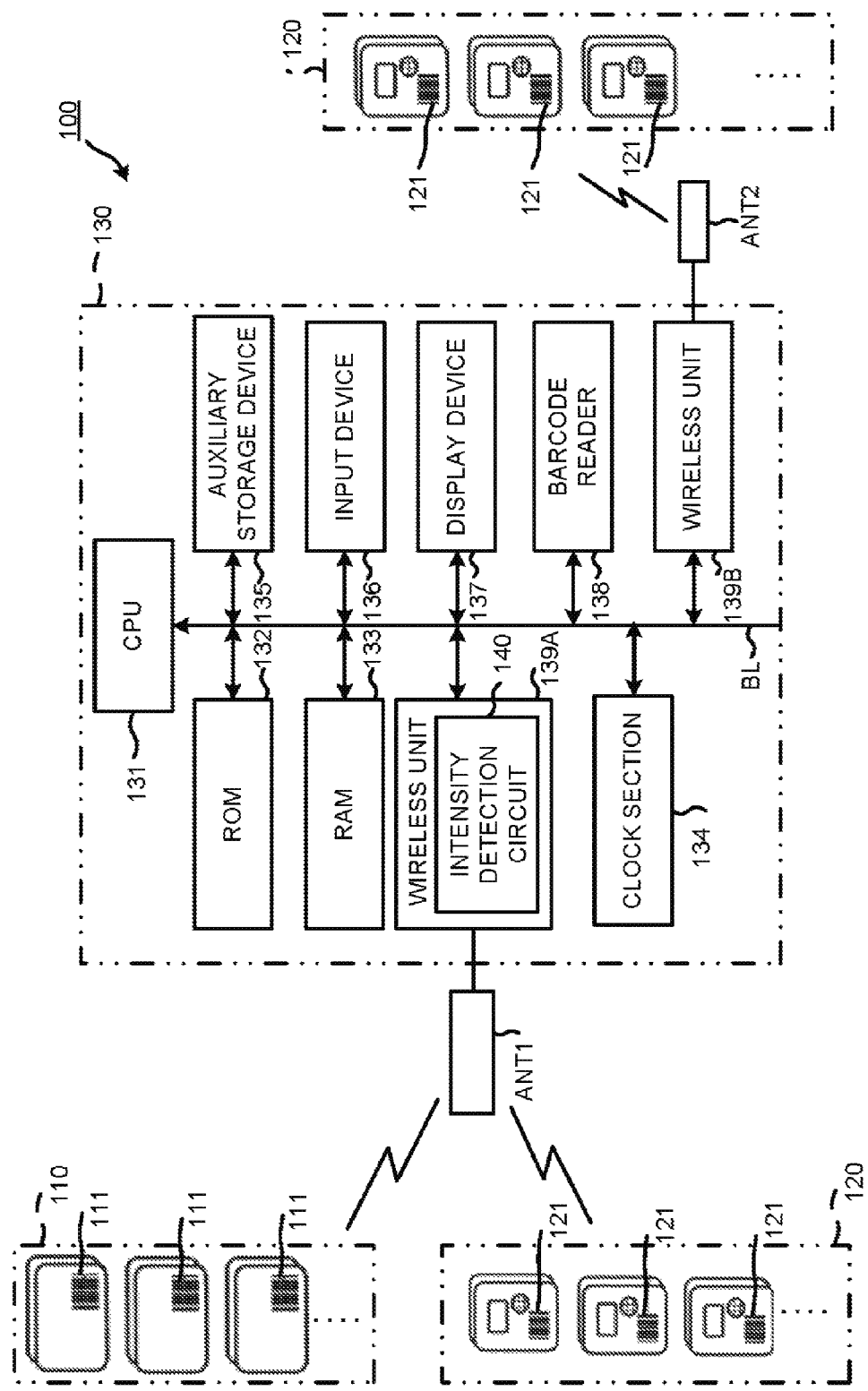
FIG. 1 is a schematic diagram illustrating whole structure of a baggage management system.

FIG. 1 is a schematic diagram illustrating whole structure of an article management system 100. The article management system 100 comprises a plurality of transmitters 110, a plurality of alarms 120 and a baggage article management apparatus 130 serving as an article management apparatus.

The transmitter 110 periodically or continuously sends beacon signals with, for example, a wireless PAN (Personal Area Network) represented by Bluetooth (Registered Trademark) or ZigBee (Registered Trademark) or a wireless LAN (Local Area Network). A fixed or unique ID (hereinafter referred to as a transmitter ID) for the transmitter 110 is contained in the beacon signal. The transmitter 110 is a kind of wireless devices for achieving a high efficiency of jobs.

The plurality of transmitters 110 are prepared at the window of an article checkroom and are handed over to users who respectively deposit baggage in the article checkroom. The user carries the transmitter 110 while the baggage of the user is deposited in the article checkroom and returns the transmitter 110 in exchange for the deposited baggage to get back the deposited baggage. The transmitter 110 to which a barcode 111 indicating the transmitter ID thereof is attached is used.

The alarm 120 carries out a notification operation when receiving a drive signal containing a fixed or unique ID (hereinafter referred to as an alarm ID) for the alarm 120. The drive signal is sent from the baggage management apparatus 130. The notification operation includes a light emission operation by a light source and a sounding operation by a sound source. The notification operation may be carried out in such a manner that the light emission operation is firstly executed for a specific time prior to the sounding operation, or in such a manner that the sounding operation is firstly executed for a specific time prior to the light emission operation. The notification operation is stopped by, for example, turning off a manual switch. The stopped notification operation is not executed again unless a reset operation is executed.

The alarm 120 periodically or continuously sends beacon signals with, for example, a wireless PAN represented by Bluetooth or ZigBee or a wireless LAN. The fixed or unique ID of the alarm 120 is contained in the beacon signal. The alarm 120 is one kind of wireless devices for achieving the high efficiency of jobs.

The plurality of alarms 120 are prepared at the window of the article checkroom and attached to baggage deposited from the users. If a user wants to deposit more than two items of baggage, the plurality of baggage are placed together and only one alarm 120 is attached to one of the baggage. The alarm 120 may be placed at the position of the baggage but not attached to the baggage. Each alarm 120 to which a barcode 121 representing the alarm ID thereof is attached is used.

The baggage management apparatus 130 comprises a CPU (Central Processing Unit) 131, a ROM (Read Only Memory) 132, a RAM (Random Access Memory) 133, a clock section 134, an auxiliary storage device 135, an input device 136, a display device 137, a barcode reader 138, a first wireless unit 139A and a second wireless unit 139B. Further, the baggage management apparatus 130 connects the CPU 131 with the ROM 132, the RAM 133, the clock section 134, the auxiliary storage device 135, the input device 136, the display device 137, the barcode reader 138, the first wireless unit 139A and the second wireless unit 139B via BLs (bus lines) including an address bus line and a data bus line. The CPU 131 acts as the center part of a computer. The CPU 131 controls each section for realizing the functions of the baggage management apparatus 130 according to an operating system or application programs.

The ROM 132 acts as the main memory part of the computer. The ROM 132 stores the foregoing operating system or application programs. The ROM 132 also stores the data needed by the CPU 131 to execute various processing for controlling each section in some cases.

The RAM 133 acts as the main memory part of the computer. The RAM 133 stores the data needed by the CPU 131 to execute various processing. Further, the RAM 133 can also function as a working area for the CPU 131 to rewrite information properly.

The clock section 134 counts the system time (date and time) of the computer as the current date and time.

The auxiliary storage device 135 acting as the auxiliary storage part of the computer is, for example, an EEPROM (Electric Erasable Programmable Read-Only Memory), an HDD (Hard Disk Drive) or an SSD (Solid State Drive). The auxiliary storage unit 135 stores the data used by the CPU 131 to execute various processing or the data generated by the CPU 131 in various processing. The auxiliary storage device 135 also stores the foregoing application programs in some cases.

The input device 136 receives the input of an instruction by an operator. The display device 137 displays various screens. The display device 136 is, for example, a keyboard, a mouse and the like. The display device 137 may be, for example, a liquid crystal display. The input device 136 and the display device 137 may be integrated with the use of a touch panel.

The barcode reader 138 optically reads the barcodes 111 and 121 which are respectively attached to the transmitter 110 and the alarm 120.

The first wireless unit 139A is connected with an antenna ANT1 to use the electric wave transmission area of the antenna ANT1 as a wireless communication area. The wireless unit 139A receives a beacon signal sent from a transmitter 110 or alarm 120 existing in the wireless communication area. The antenna ANT1 is mounted nearby the window of the article checkroom. By using the antenna ANT1 with directivity, the baggage management apparatus 130 can widely set the wireless communication area in the direction of the directivity of the antenna ANT1 based on the window. By using the antenna ANT1 with non-directivity, the baggage management apparatus 130 can set the wireless communication area concentrically from the window acting as a center. The antenna ANT1 and the wireless unit 139A function as the receiver for receiving the electric wave wirelessly sent from the transmitter 110.

The wireless unit 139A comprises an intensity detection circuit 140. The intensity detection circuit 140 detects the intensity (db) of the electric wave received by the antenna ANT1.

The second wireless unit 139B is connected with an antenna ANT2 to use the electric wave propagation area of the antenna ANT2 as a wireless communication area. The wireless unit 139B transmits a drive signal to the alarm 120 existing in the wireless communication area. Other than the general antennas, for example, a leakage coaxial cable which is laid on the ceiling of a place for baggage may also be used as the antenna ANT2.

The baggage management apparatus 130 with the foregoing structure may be a computer such as a personal computer or a tablet computer terminal. In a case in which the computer of this kind is used as the baggage management apparatus 130, the barcode reader 138 is connected with the baggage management apparatus 130 via a peripheral device interface such as a USB. Further, the computer (the baggage management apparatus 130) is placed at the window of the article checkroom.

Figures 2, 3:
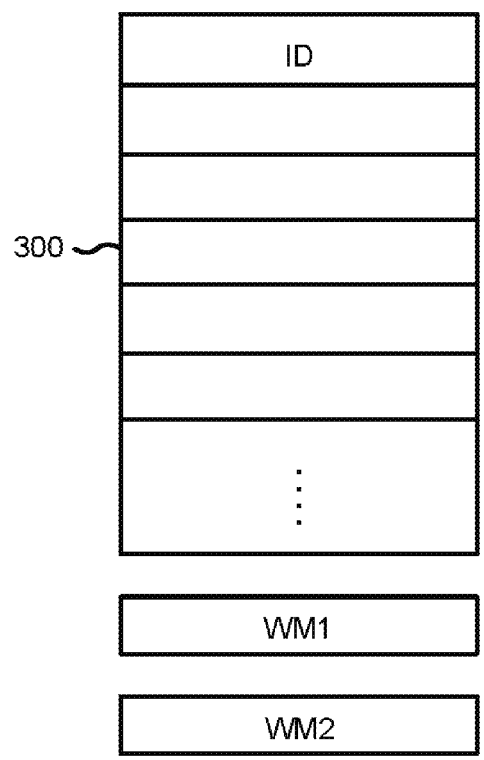
FIG. 2 is a schematic diagram illustrating a conversion table.
FIG. 3 is a schematic diagram illustrating an ID buffer and a working memory.

The baggage management apparatus 130 has three job modes, i.e., a confirmation job, a deposit job and a notification job. The baggage management apparatus 130 can execute the three jobs in parallel. The three jobs are controlled by different application programs respectively. Further, at the time of carrying out each of the three jobs, the baggage management apparatus 130 needs a conversion table 200 shown in FIG. 2, an ID buffer 300 and a pair of working memories WM1 and WM2 shown in FIG. 3, an association file 400 shown in FIG. 4 and a tracking file 500 shown in FIG. 5.

The conversion table 200 is a data table for the conversion of the intensity (db) of the electric wave received by the antenna ANT1 from a transmitter 110 into the relative distance (m) between the transmitter 110 and the antenna ANT1. For example, at the time the baggage management system 100 is introduced, a relative distance (m) corresponding to the electric wave intensity (db) is experimentally evaluated and set in the conversion table 200. The conversion table 200 is stored in the ROM 132 or the auxiliary storage device 135.

The ID buffer 300 collectively stores the transmitter IDs or alarm IDs received by the wireless unit 139A within a specific time. The working memory WM1 temporarily stores the transmitter ID of a transmitter 110 delivered to a user. The working memory WM2 temporarily stores the alarm ID of an alarm 120 attached to the baggage deposited by a user.

The association file 400 is a data file in which a plurality of records each of which consists of a transmitter ID, an alarm ID and a deposit date and time as one record is stored. The association file 400 is formed in the auxiliary storage device 135 or the RAM 133.

The tracking file 500 is a data file in which a plurality of records each of which consists of a transmitter ID, an electric wave intensity Am (db), a distance Dn (m), a display flag F1 and a notification flag F2 as one record is stored. The tracking file 500 is formed in the auxiliary storage device 135 or the RAM 133. An alarm ID associated with a transmitter ID may also be contained in the record of the tracking file 500.

The three jobs are sequentially described below. The confirmation job is described first with reference to the flowchart of FIG. 6. The confirmation job refers to a job of confirming the transmitter ID or alarm ID contained in a beacon signal sent from the transmitter 110 or the alarm 120. Further, the confirmation job includes a tracking processing of tracking the change in the distance between the antenna ANT 1 and the transmitter 110 identified by the transmitter ID.

Figure 6:
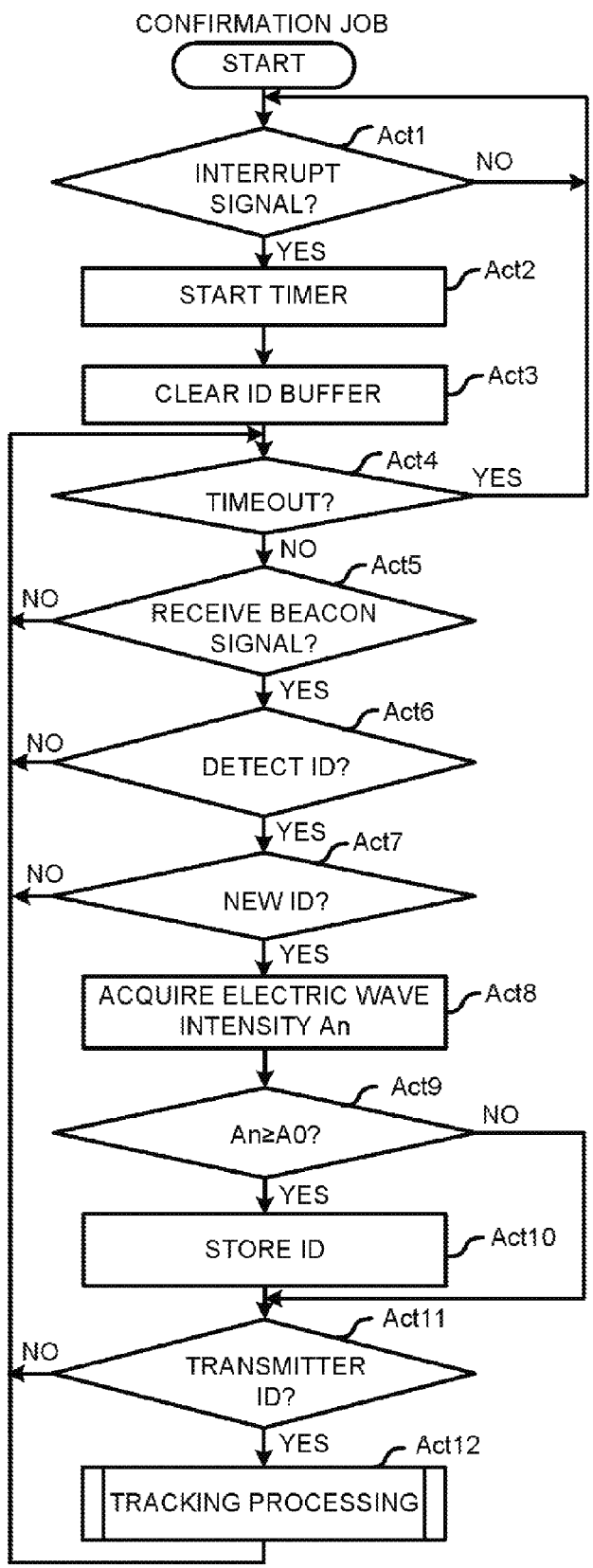
FIG. 6 is a flowchart illustrating procedures of a confirmation job.

If the baggage management apparatus 130 is started, then an application program for controlling the confirmation job is started. If the program is started, then the CPU 131 starts the processing the procedures of which are shown in the flowchart of FIG. 6. First, the CPU 131 waits for an interrupt signal (Act 1). For example, the interrupt signal is generated for every time that one minute counted by the clock section 134 elapses.

If the interrupt signal is detected (Act 1: Yes), then the CPU 131 starts a built-in timer (Act 2). Further, the CPU 131 clears the ID buffer 300 (Act 3). Not limited to be carried out in the foregoing sequence (Act 2 and ACT 3), the processing in Act 3 may be carried out prior to the processing in Act 2.

The CPU 131 waits for the timeout of the timer (Act 4). Further, the CPU 131 determines whether a beacon signal is received (Act 5). If a beacon signal is received (Act 5: Yes) prior to the timeout of the timer (Act 4: No), the CPU 131 detects a transmitter ID or an alarm ID from the beacon signal (Act 6). If no transmitter ID or alarm ID is detected (Act 6: No), the CPU 131 waits for the timeout of the timer (Act 4) or waits to receive the next beacon signal (Act 5)

If a transmitter ID or alarm ID is detected (Act 6: Yes), the CPU 131 determines whether or not the detected ID is a new ID which is not registered in the ID buffer 300 (Act 7). If the ID detected is not a new ID (Act 7: No), the CPU 131 waits for the timeout of the timer (Act 4) or waits to receive the next beacon signal (Act 5).

If the ID detected is a new ID (Act 7: Yes), the CPU 131 acquires the electric wave intensity An (db) detected by the intensity detection circuit 140 (Act 8). The CPU 131 determines whether or not the electric wave intensity An is equal to or greater than a threshold value A0 (Act 9). The threshold value A0 is the minimal value of the electric wave intensity detected when the beacon signals sent from the plurality of transmitters 110 or alarms 120 prepared at the window of the article checkroom are received by the antenna ANT1. The minimal value (threshold value A0) is experimentally evaluated.

If the electric wave intensity An is equal to or greater than the threshold value A0 (Act 9: Yes), then it is presumed that the transmitter 110 or the alarm 120 which is a source of the beacon signal is one of the plurality of transmitters 110 or alarms 120 prepared at the window of the article checkroom. In this case, the CPU 131 stores the ID (transmitter ID or alarm ID) detected from the beacon signal in the ID buffer 300 (Act 10).

If the electric wave intensity An is less than the threshold value A0 (Act 9: No), then it is presumed that the transmitter 110 or the alarm 120 which is a source of the beacon signal is far away from the window of the article checkroom or is one generating a weak output under a failure in operation. In this case, the CPU 131 does not carry out the processing in Act 10. The CPU 131 discards the ID (transmitter ID or alarm ID) detected from the beacon signal without storing the ID in the ID buffer 300.

The CPU 131 determines whether or not the ID detected from the beacon signal is a transmitter ID (Act 11) Different category flags are contained in the transmitter ID attached to each transmitter 110 and the alarm ID attached to each alarm 120. The CPU 131 determines whether the ID detected is a transmitter ID or an alarm ID by identifying the category flag contained in the ID detected. Further, not limited to be determined according to a category flag, a transmitter ID or an alarm ID may also be identified according to the format of the ID which is different between the transmitter ID and the alarm ID.

If the detected ID is not a transmitter ID but an alarm ID (Act 11: No), the CPU 131 waits for the timeout of the timer (Act 4) or waits to receive the next beacon signal (Act 5). If the detected ID is a transmitter ID (Act 11: Yes), the CPU 131 carries out a tracking processing (Act 12). The tracking processing will be described in detail later. If the tracking processing is ended, the CPU 131 waits for the timeout of the timer (Act 4) or waits to receive the next beacon signal (Act 5).

If the timer takes timeout (Act 4: Yes), then the CPU 131 returns to the processing in Act 1 to wait for the next interrupt signal. Afterwards, the CPU 131 repeats the processing in Act 2-Act 12 every time the interrupt signal is received.

Figure 7:
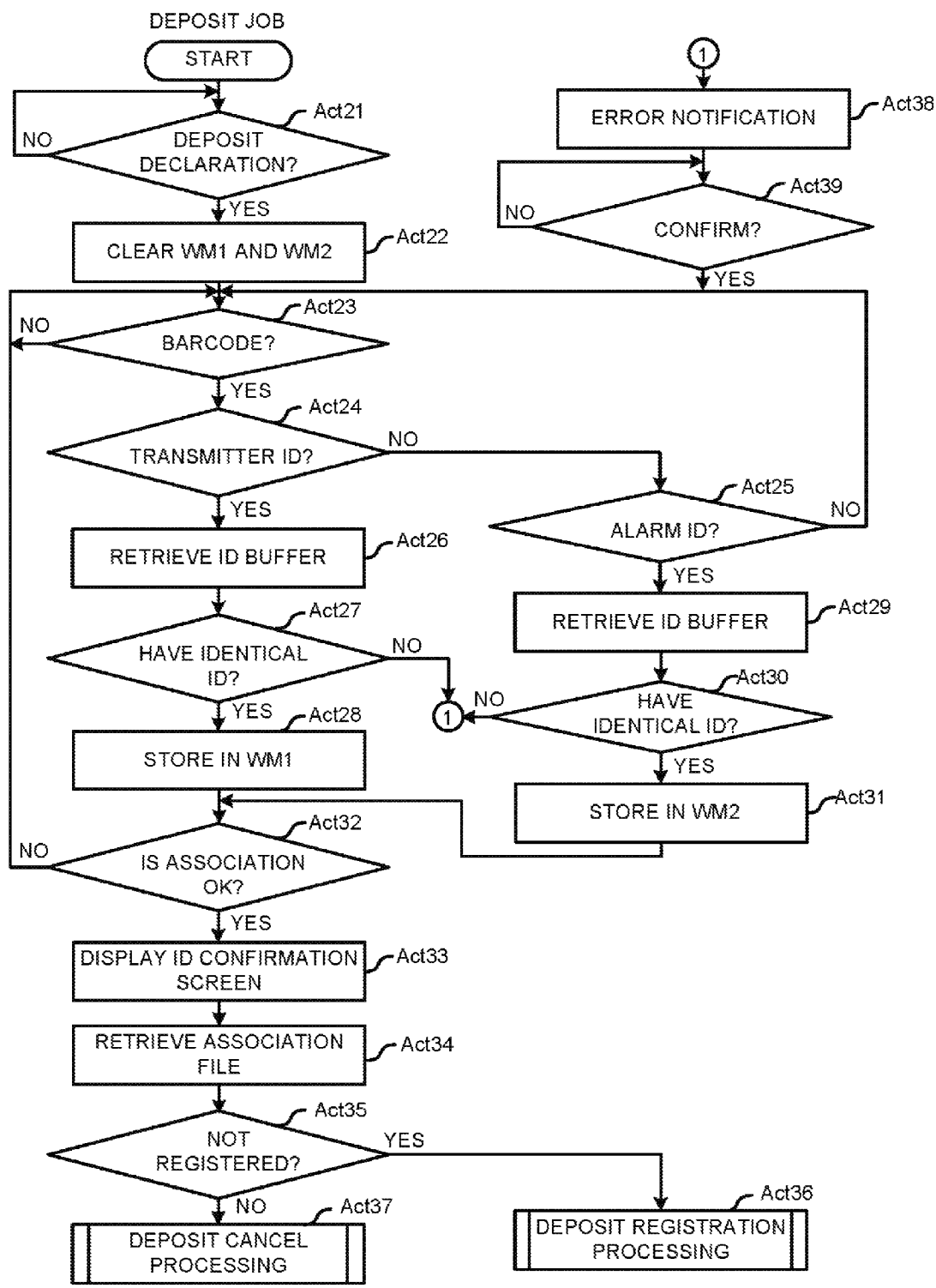
FIG. 7 is a flowchart illustrating procedures of a deposit job.

Then, the deposit job is described with reference to the flowcharts in FIG. 7 and FIG. 8.

If the baggage management apparatus 130 is activated, then an application program for controlling the deposit job is started. If the program is started, then the CPU 131 starts the processing the procedures of which are shown in the flowchart in FIG. 7. First, the CPU 131 waits for a deposit declaration (Act 21). If the input device 136 is a keyboard, then the CPU 131 waits for the input of a deposit declaration key assigned to the keyboard. If the input device 136 is a mouse, the CPU 131 waits for the click on a deposit declaration icon displayed on the display device 137.

When a user who deposits a baggage comes to the window, a person in charge at the window operates the input device 136 to input the deposit declaration key or clicks the deposit declaration icon. If the deposit declaration is received (Act 21: Yes), the CPU 131 clears the pair of working memories WM1 and WM2 (Act 22).

The CPU 131 waits for the input of barcode data (Act 23). If a barcode is read by the barcode reader 138 (Act 23: Yes: input module), then the CPU 131 identifies whether the barcode data is a transmitter ID (Act 24) or an alarm ID (Act 25). As stated above, different category flags are contained in the transmitter ID attached to each transmitter 110 and the alarm ID attached to each alarm 120. The CPU 131 determines whether the barcode data is a transmitter ID or an alarm ID by identifying the category flag contained in the barcode data.

If the barcode data is neither a transmitter ID (Act 24: No) nor an alarm ID (Act 25: No), the CPU 131 waits for the input of next barcode data (Act 23).

If the barcode data is a transmitter ID (Act 24: Yes), the CPU 131 executes a retrieval operation in the ID buffer 300

(Act 26). Further, the CPU 131 determines whether or not an ID identical to the transmitter ID identified according to the barcode data is stored in the ID buffer 300 (Act 27).

The person in charge at the window who makes a deposit declaration picks out a transmitter 110 to be handed over to the user in exchange for the baggage of the user. The person in charge operates the barcode reader 138 to read the barcode 111 attached to the transmitter 110. At this time, the transmitter 110 is one of the plurality of transmitters 110 prepared at the window of the article checkroom. Thus, the transmitter ID of the transmitter 110 is stored in the ID buffer 300 as long as the transmitter 110 is not one generating a weak output under the failure in operation.

The transmitter 110 identified by the transmitter ID is a normal wireless device if an ID identical to the transmitter ID is stored in the ID buffer 300 (Act 27: Yes). In this case, the CPU 131 stores the transmitter ID in the working memory WM1 (Act 28.)

If the barcode data is an alarm ID (Act 25: Yes), the CPU 131 executes a retrieval operation in the ID buffer 300 (Act 29). Further, the CPU 131 determines whether or not an ID identical to the alarm ID identified by the barcode data is stored in the ID buffer 300 (Act 30).

The person in charge of the window who makes the deposit declaration takes out an alarm 120 to be attached to the baggage deposited by the user. Further, the person in charge operates the barcode reader 138 to read the barcode 121 attached to the alarm 120. At this time, the alarm 120 is one of the plurality of alarms 120 prepared at the window of the article checkroom. Thus, the alarm ID of the alarm 120 is stored in the ID buffer 300 as long as the alarm 120 is not one generating a weak output under the failure in operation.

The alarm 120 identified by the alarm ID is a normal wireless device if an ID identical to the alarm ID is stored in the ID buffer 300 (Act 30: Yes). In this case, the CPU 131 stores the alarm ID in the working memory WM2 (Act 31).

The CPU 131 determines whether or not the transmitter ID is associated with the alarm ID (Act 32). The CPU 131 determines that the transmitter ID is associated with the alarm ID if the transmitter ID and the alarm ID are respectively stored in the pair of working memories WM1 and WM2. The CPU 131 determines that the transmitter ID is not associated with the alarm ID if only one of the transmitter ID and the alarm ID is stored. The CPU 131 waits for the input of the next barcode data (Act 23) if the transmitter ID is not associated with the alarm ID (Act 32: No).

If the transmitter ID is associated with the alarm ID (Act 32: Yes), the CPU 131 displays an ID confirmation screen 600 (refer to FIG. 12) on the display device 137 (Act 33).

Figure 12:
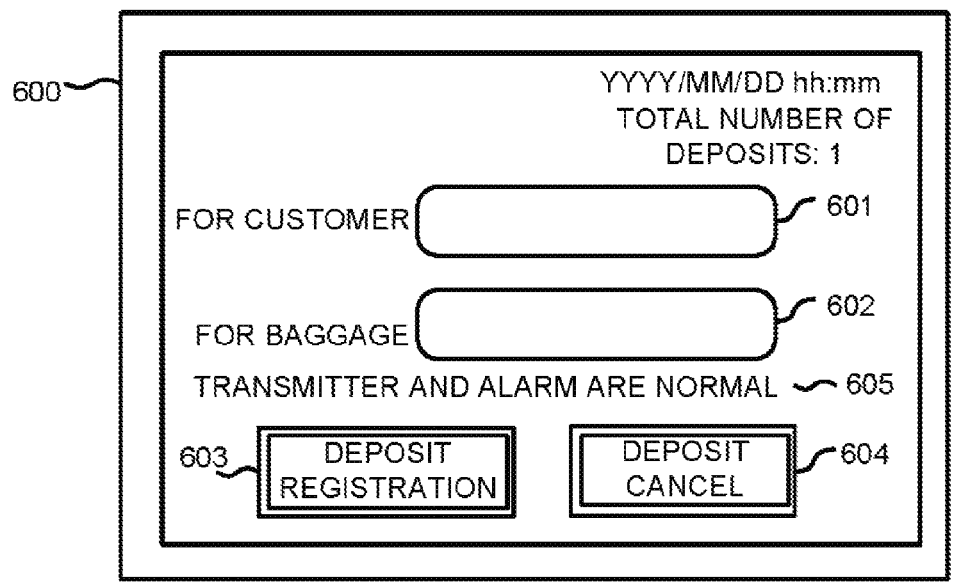
FIG. 12 is a schematic diagram exemplifying an ID confirmation screen.

FIG. 12 exemplifies the ID confirmation screen 600. As shown in FIG. 12, a display area 601 for customer, a display area 602 for baggage, a deposit registration button 603 and a deposit cancellation button 604 are included in the ID confirmation screen 600 as display components.

The CPU 131 displays the transmitter ID stored in the working memory WM1 in the display area 601 for customer. Further, the CPU 131 displays the alarm ID stored in the working memory WM2 in the display area 602 for baggage. The CPU 131 further displays a message 605 indicating that the transmitter 110 determined by the transmitter ID and the alarm 120 determined by the alarm ID are normal. Further, the deposit registration button 603 and the deposit cancellation button 604 are both unavailable at a point of time. Thus, the button 603 or 604 cannot be input even if the person in charge at the window tries to operate the input device 136 to input the button 603 or 604.

After the ID confirmation screen 600 is displayed, the CPU 131 executes a retrieval operation in the association file 400. Further, the CPU 131 determines whether or not a record containing the transmitter ID stored in the working memory WM1 and the alarm ID stored in the working memory WM2 is registered in the association file 400 (Act 35). If the record is not registered in the association file 400 (Act 35: Yes), the CPU 131 carries out a deposit registration processing (Act 36). If the record is registered in the association file 400 (Act 35: No), the CPU 131 carries out a deposit cancellation processing (Act 37).

Figure 8:
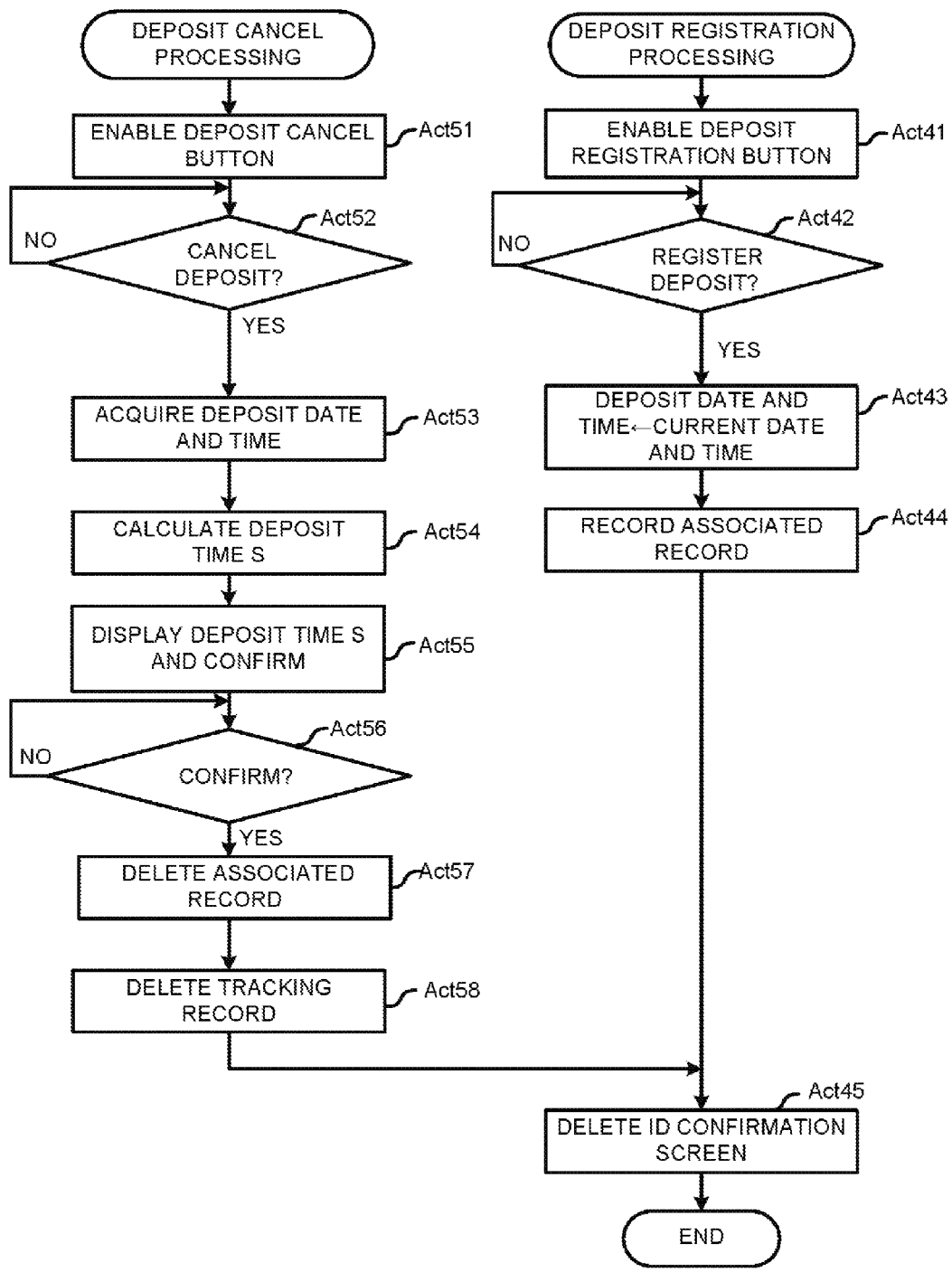
FIG. 8 is a flowchart illustrating procedures of a deposit registration processing and a deposit cancellation processing.

The procedures of the deposit registration processing and those of the deposit cancellation processing are shown in the flowchart of FIG. 8. If the deposit registration processing is executed, the CPU 131 first enables the function of the deposit registration button 603 on the ID confirmation screen 600 (Act 41). Then, the CPU 131 waits for the input of the deposit registration button 603 (Act 42).

After confirming that the transmitter 110 the barcode 111 of which is read and the alarm 120 the barcode 121 of which is read are normal according to the ID confirmation screen 600, the person in charge of the window operates the input device 136 to input the deposit registration button 603.

When the deposit registration button 603 is input, the CPU 131 acquires the date and time data counted by the clock section 134 as the date and time the user deposits the baggage (Act 43). Further, the CPU 131 records the transmitter ID stored in the working memory WM1, the alarm ID stored in the working memory WM2 and the deposit date and time data acquired in Act 43 in the association file 400 as one record (Act 44: an association module). Sequentially, the CPU 131 erases the ID confirmation screen 600 (Act 45), then the deposit registration processing is ended.

On the other hand, if the deposit cancellation processing is executed, then the CPU 131 enables the function of the deposit cancellation button 604 on the ID confirmation screen 600 (Act 51). Then, the CPU 131 waits for the input of the deposit cancellation button 604 (Act 52).

When the user who has deposited the baggage comes to receive the baggage, the person in charge of the window reads the barcode 111 of the transmitter 110 received from the user and the barcode of the alarm 120 attached to the baggage deposited by the user with the barcode reader 138. In this case also, since the transmitter 110 is located at the window, the transmitter ID is stored in the ID buffer 300. Similarly, since the alarm 120 is located at the window, the alarm ID is also stored in the ID buffer 300. Thus, the ID confirmation screen 600 is displayed on the display device 137. Then, the person in charge of the window operates the input device 136 to input the deposit cancellation button 604.

Figure 13:
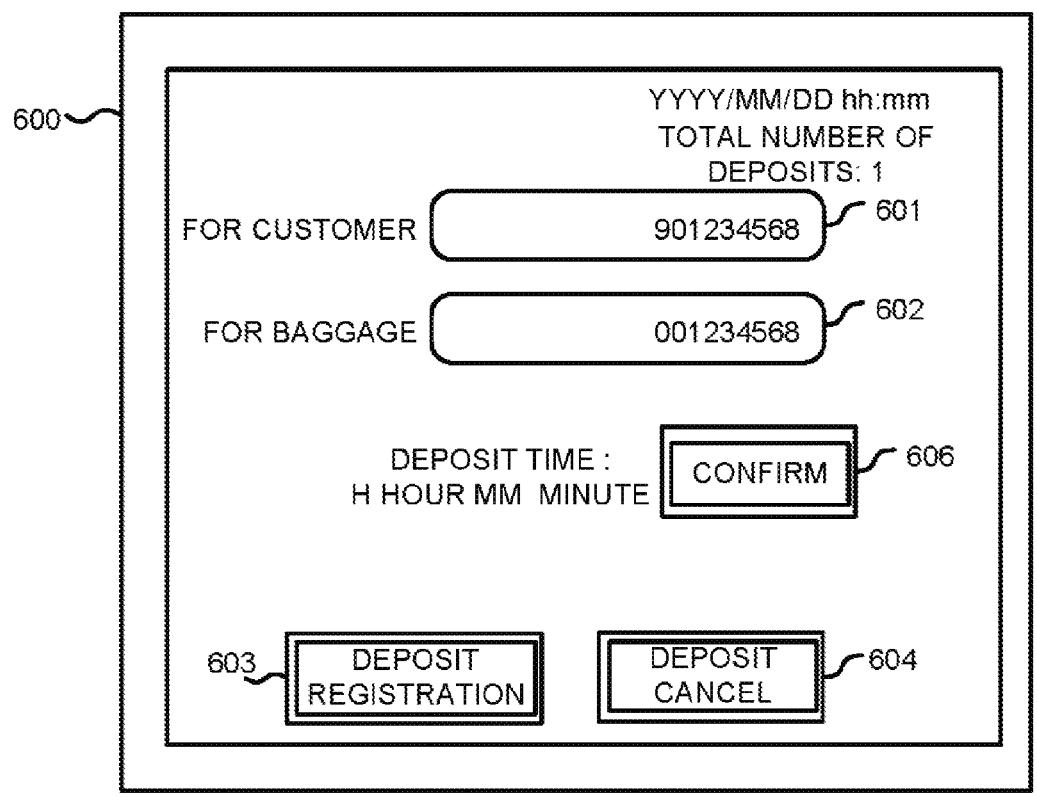
FIG. 13 is a schematic diagram exemplifying an ID confirmation screen.

When the deposit cancellation button 604 is input, the CPU 131 acquires a deposit date and time from a record in the association file 400 which contains the transmitter ID stored in the working memory WM1 and the alarm ID stored in the working memory WM2 (Act 53). Further, the CPU 131 calculates a deposit time S from the deposit date and time to the current date and time counted by the clock section 134 (Act 54). As shown in FIG. 13, the CPU 131 displays the deposit time S, together with a button 'confirm' 606, on the ID confirmation screen 600 (Act 55). Then, the CPU 131 waits for the input of the button 'confirm' 606 (Act 56).

Then, after confirming the deposit time S, the person in charge of the window operates the input device 136 to input the button 'confirm' 606. When the button 'confirm' 606 is input (Act 56: Yes), the CPU 131 deletes, from the association file 400, the record containing the transmitter ID stored in the working memory WM1 and the alarm ID stored in the working memory WM2 (Act 57).

Further, the CPU 131 deletes, from the tracking file 500, the record containing the transmitter ID stored in the working memory WM1 (Act 58). Sequentially, the CPU 131 erases the ID confirmation screen 600 (Act 45). Then, the deposit cancellation processing is ended. Other than physically deleting the record, the record may be invalid in such a manner that a deletion flag is set on the record.

In this way, if the deposit registration processing or the deposit cancellation processing is ended, then the application program for controlling the deposit job returns to the initial step. The CPU 131 restarts the processing the procedures of which are shown in the flowchart of FIG. 7.

On the other hand, if an ID identical to the transmitter ID is not being stored in the ID buffer 300 (Act 27: No), the transmitter 110 the barcode 111 of which is read is determined that a beacon signal sending function is out of order. Similarly, if an ID identical to the alarm ID is not stored in the ID buffer 300 (Act 30: No), the alarm 120 the barcode 121 of which is read is also determined that a beacon signal sending function is out of order. In this case, the CPU 131 notifies the abnormality of the transmitter 110 or the alarm 120 (Act 38). For example, the CPU 131 displays a message indicating that the transmitter 110 or the alarm 120 is out of order, together with the button 'confirm' 606, on the display device 137. The CPU 131 waits for the input of the button 'confirm' (Act 39). If the button 'confirm' is input through the operation of the input device 136 (Act 39: Yes), then the CPU 131 waits for the input of the next barcode data (Act 23).

Figure 9:
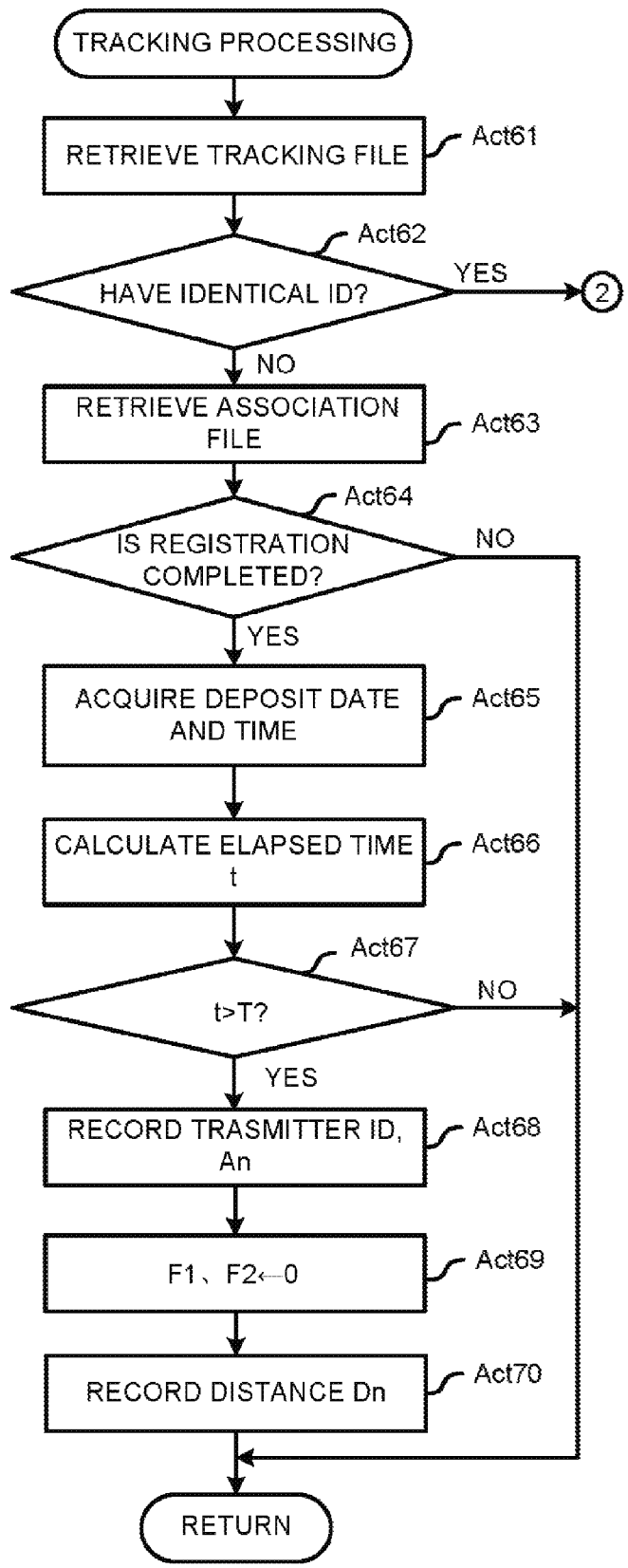
FIG. 9 is a flowchart illustrating procedures of a tracking processing.

Then, the description of the deposit job is ended. Next, the tracking processing (Act 12 shown in FIG. 5) is described with reference to the flowcharts in FIG. 9 and FIG. 10.

If the tracking processing is started, the CPU 131 executes a retrieval operation in the tracking file 500 according to the transmitter ID detected from the beacon signal (Act 61). Further, the CPU 131 determines whether or not a record containing the same transmitter ID is registered in the tracking file 500 (Act 62). If the record is not registered in the tracking file 500 (Act 62: No), the CPU 131 executes a retrieval operation in the association file 400 using the transmitter ID (Act 63). The CPU 131 further determines whether or not a record containing the same transmitter ID is registered in the association file 400 (Act 64). If a record containing the same transmitter ID is not registered in the association file 400 (Act 64: No), the CPU 131 exits the tracking processing.

If a record containing the same transmitter ID is registered in the association file 400 (Act 64: Yes), the CPU 131 acquires a deposit date and time data at which the baggage is deposited from the record (Act 65). The CPU 131 calculates an elapsed time t between the deposit date and time and the current date and time counted by the clock section 134 (Act 66).

The CPU 131 determines whether or not the elapsed time t is longer than a determination time T (Act 67). The determination time T is a period of time which is enough for the user who deposits the baggage to pass through the wireless communication area of the antenna ANT1 and thus is set optionally.

If the elapsed time t is shorter than the determination time T, then the received transmitter ID can be considered as an ID sent from the transmitter 110 delivered to the user who just deposits the baggage. In this case (Act 67: No), the CPU 131 exits the tracking processing.

If the elapsed time t is longer than the determination time T (Act 67: Yes), then the received transmitter ID can be considered as an ID sent from the transmitter 110 carried by the user who comes to receive the baggage. Further, the received transmitter ID can also be considered as an ID sent from the transmitter 110 carried by the user who just enters the wireless communication area of the antenna ANT1. In this case, the CPU 131 records a record containing the transmitter ID and the electric wave intensity An(db) in the tracking file 500 (Act 68). The CPU 131 resets the display flag F1 and notification flag F2 of the record to 0 (Act 69). The CPU 131 converts the electric wave intensity An (db) into the relative distance Dn(m) between the transmitter 110 and the antenna ANT1 with reference to the conversion table 200. Further, the CPU 131 records the relative distance Dn(m) in the record (Act 70). Then, the CPU 131 exits the tracking processing.

Figure 10:
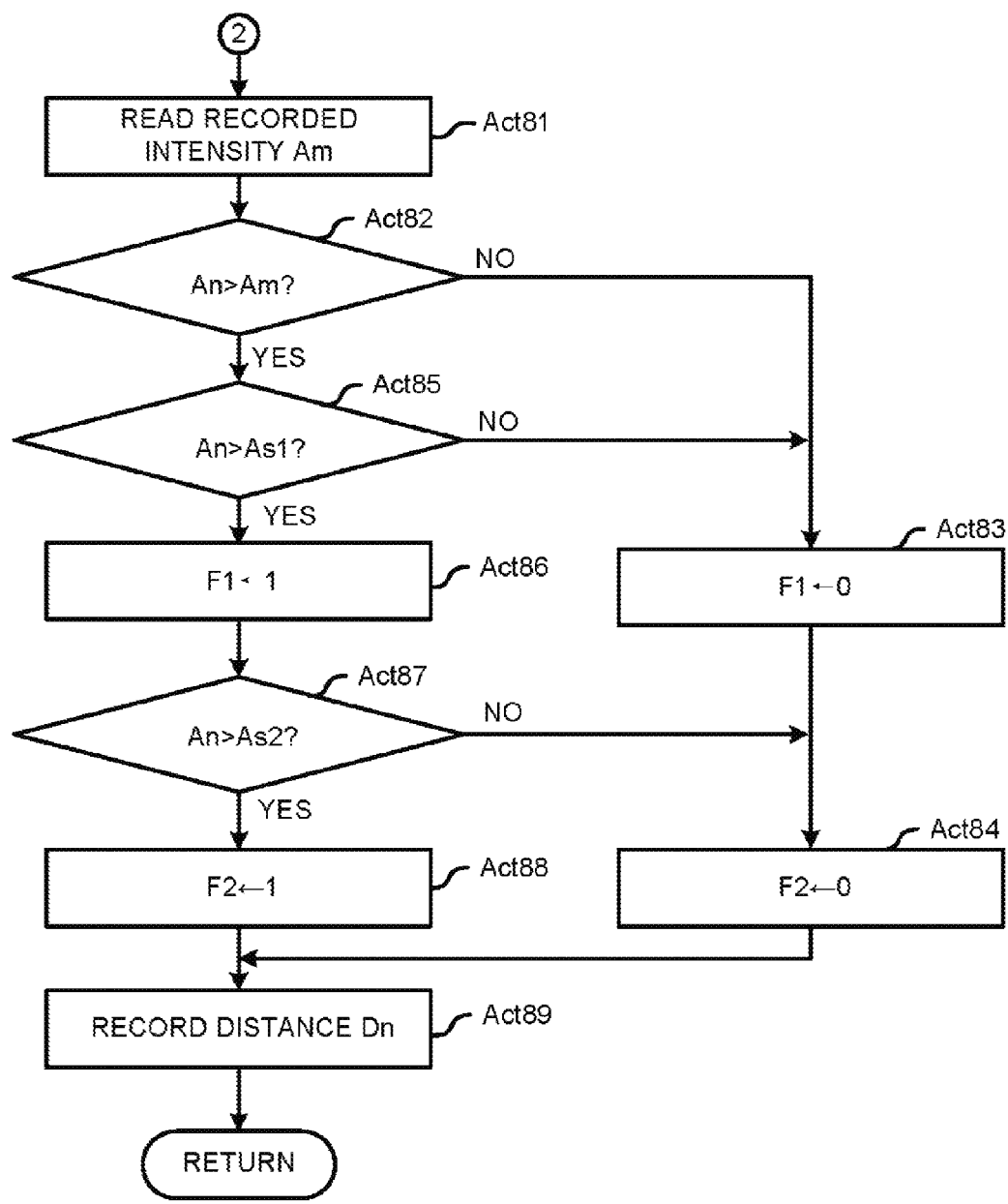
FIG. 10 is a flowchart illustrating procedures of a tracking processing.

If a record containing the same transmitter ID is registered in the tracking file 500 (Act 62: Yes), the CPU 131 reads the electric wave intensity Am (db) recorded in the record (Act 81), as shown in FIG. 10. Then, the CPU 131 compares the electric wave intensity Am (db) with the electric wave intensity An (db) acquired in Act 8 (Act 82).

If the electric wave intensity An (db) is lower than the electric wave intensity Am (db), in other words, if the electric wave intensity becomes weaker and weaker as time elapses, then it can be determined that the user is getting away from the window of the article checkroom. In this case (Act 82: No), the CPU 131 resets the display flag F1 of the record to 0 (Act 83). The CPU 131 also resets the notification flag F2 of the record to 0 (Act 84). Further, the CPU 131 converts the electric wave intensity An (db) to the relative distance Dn (m) between the transmitter 110 and the antenna ANT1 with reference to the conversion table 200. Then, the CPU 131 records the relative distance Dn (m) in the record (Act 89). After that, the CPU 131 exits the tracking processing.

Contrarily, if the electric wave intensity An (db) is higher than the electric wave intensity Am (db), in other words, if the electric wave intensity becomes stronger and stronger as time elapses, then it can be determined that the user is approaching the window of the article checkroom. In this case (Act 82: Yes), the CPU 131 determines whether or not the electric wave intensity An (db) is greater than a first threshold value As1 (db) (Act 85). The first threshold value As1 (db) can be considered as the value of the intensity of the electric wave from a transmitter 110, which operates normally, positioned apart from the antenna ANT1 by a relative distance of, for example, 50 m.

If the electric wave intensity An (db) is lower than the first threshold value As1 (db), then it can be determined that the user does not come within 50 m of the window. In this case (Act 85: No), the CPU 131 resets the display flag F1 of the record containing the received transmitter ID to 0 (Act 83). The CPU 131 also resets the notification flag F2 of the record to 0 (Act 84). Further, the CPU 131 converts the electric wave intensity Am (db) to the relative distance Dn (m) between the transmitter 110 and the antenna ANT1 with reference to the conversion table 200. Then, the CPU 131 records the relative distance Dn (m) in the record (Act 89). After that, the CPU 131 exits the tracking processing.

Contrarily, if the electric wave intensity An (db) is higher than the first threshold value As1 (db), then it can be determined that the user comes within 50 m of the window. In this case (Act 85: Yes), the CPU 131 sets the display flag F1 of the record containing the received transmitter ID to 1 (Act 86).

Then, the CPU 131 determines whether or not the electric wave intensity An (db) is higher than a second threshold value As2 (Act 87). The second threshold value As2 (db) can be considered as the value of the intensity of the electric wave received from the transmitter 110 which is positioned apart from the antenna ANT1 by a relative distance of, for example, 30 m.

If the electric wave intensity An (db) is lower than the second threshold value As2 (db), then it can be considered that the user does not come within 30 m of the window. In this case (Act 87: No), the CPU 131 resets the notification flag F2 of the record containing the received transmitter ID to 0 (Act 84). Further, the CPU 131 converts the electric wave intensity Am (db) to the relative distance Dn (m) between the transmitter 110 and the antenna ANT1 with reference to the conversion table 200. Then, the CPU 131 records the relative distance Dn (m) in the record (Act 89). After that, the CPU 131 exits the tracking processing.

Contrarily, if the electric wave intensity An (db) is higher than the second threshold value As2 (db), then it can be determined that the user comes within 30 m of the window. In this case (Act 87: Yes), the CPU 131 sets the notification flag F2 of the record containing the received transmitter ID to 1 (Act 88). Further, the CPU 131 converts the electric wave intensity Am (db) to the relative distance Dn (m) between the transmitter 110 and the antenna ANT1 with reference to the conversion table 200. Then, the CPU 131 records the relative distance Dn (m) in the record (Act 89). After that, the CPU 131 exits the tracking processing.

Further, the first threshold value As1 and the second threshold value As2 can be set optionally as long as the As1 lower than the As2 is kept.

Figure 11:
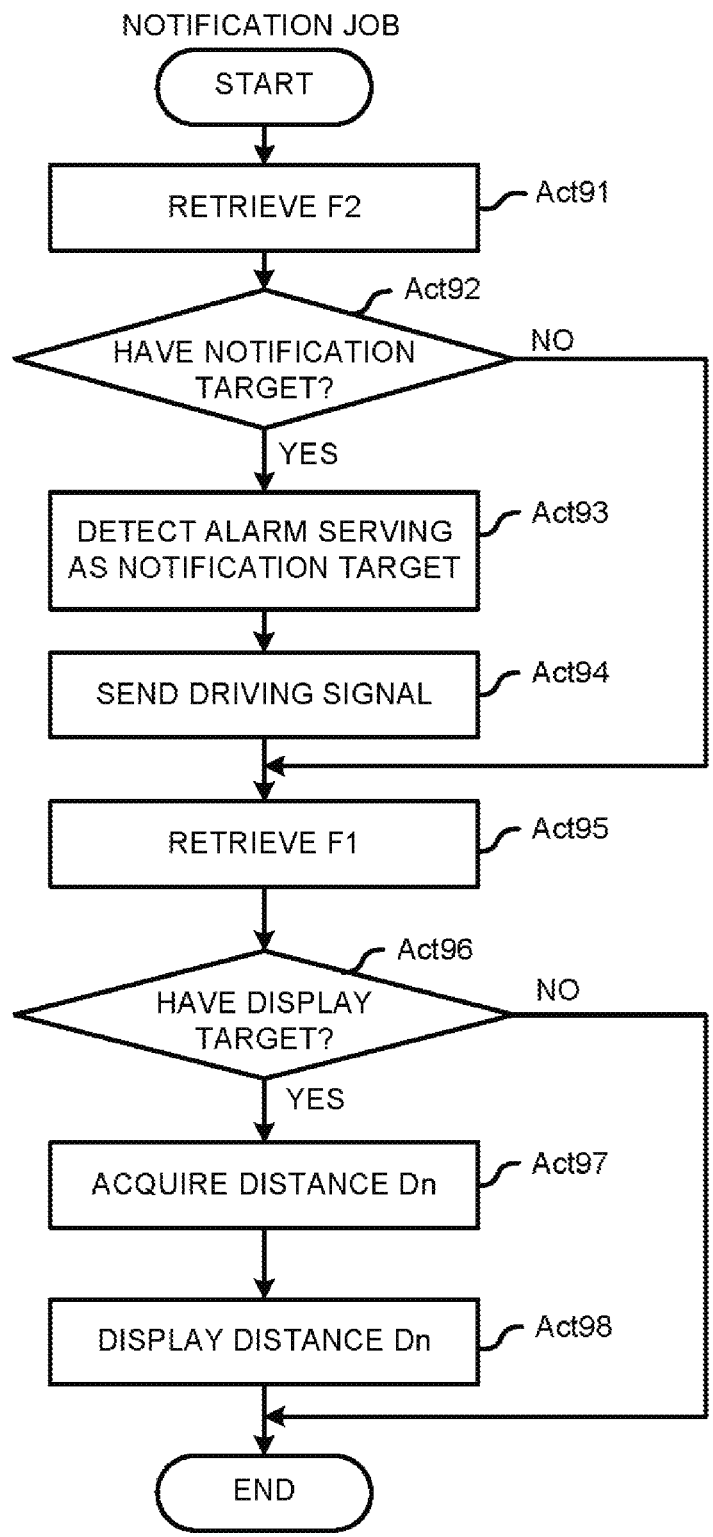
FIG. 11 is a flowchart illustrating procedures of a notification job.

Then, the notification job is described with reference to the flowchart in FIG. 11.

An application program for controlling the notification job is started in response to interrupt signals which are generated at a specific interval (e.g. 1 second). If the program is started, then the CPU 131 starts the processing the procedures of which are shown in the flowchart in FIG. 11. First, the CPU 131 retrieves the notification flag F2 in each record recorded in the tracking file 500 (Act 91). Then, the CPU 131 determines whether or not there is a record of which the notification flag F2 is set to 1 (Act 92)

If there is a record of which the notification flag F2 is set to 1 (Act 92: Yes), then the record is a notification target. In this case, the CPU 131 executes a retrieval operation in the association file 400 according to the transmitter ID contained in the record. Then, the CPU 131 detects an alarm ID associated with the transmitter ID (Act 93). The CPU 131 sends a drive signal containing the alarm ID from the antenna ANT2 via the wireless unit 139B (Act 94: a determination-output module).

Further, if there are a plurality of records of which the notification flags are set to 1, the CPU 131 executes a retrieval operation in the association file 400 according to the transmitter ID contained in each record to detect each alarm ID associated with the transmitter ID. The CPU 131 respectively sends drive signals each containing a different alarm ID from the antenna ANT2 via the wireless unit 139B in a time division manner.

In response to the transmission of the drive signal containing an alarm ID, the alarm 120 to which the alarm ID is set carries out a notification operation with sound and light. The baggage to which the alarm 120 carrying out the notification operation is attached is one deposited by a user who comes within 30m of the window. In this way, the person in charge of the window or the baggage deposit place can find the baggage deposited by the user and bring the found baggage to the window in advance while the user comes to the window. As a result, a time required to deliver the baggage at the window is shortened, and thus high efficiency of the jobs at the window can be achieved.

After the drive signal is sent or if there is no record of the notification target (Act 92: No), the CPU 131 retrieves the display flag Fl in the tracking file 500 (Act 95). The CPU 131 determines whether or not there is a record of which the display flag F1 is set to 1 (Act 96). The processing is ended if there is no record of which the display flag F1 is set to 1 (Act 96: No).

If there is a record of which the display flag F1 is set to 1 (Act 96: Yes), then the record is a display target. In this case, the CPU 131 acquires a transmitter ID and a distance Dn from the record. If there is a plurality of records of which the display flags F1 are set to 1, then the CPU 131 acquires a transmitter ID and a distance Dn from each of the records (Act 97). The CPU 131 displays, for example, a notification screen 700 the layout of which is shown in FIG. 14 on the display device 137 according to the data acquired from the tracking file 500 (Act 98).

Figure 14:
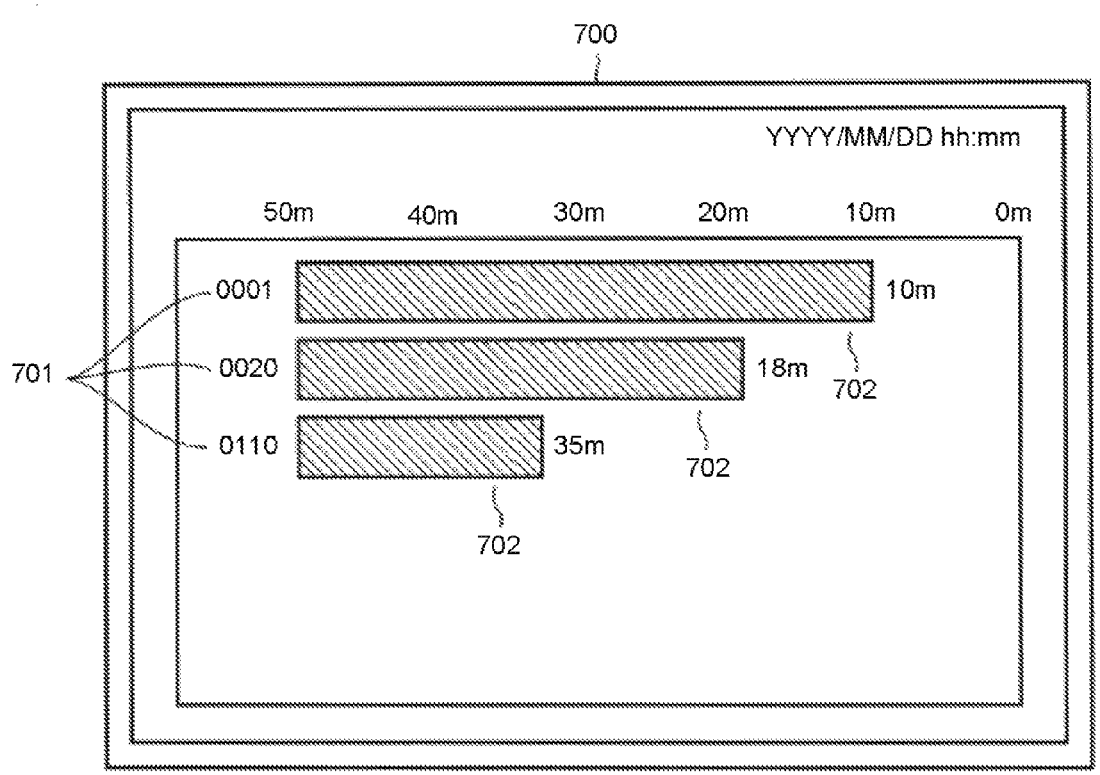
FIG. 14 is a schematic diagram exemplifying a notification screen.

As shown in FIG. 14, transmitter IDs 701 and indicators 702 each of which indicates a distance Dn (m) are displayed on the notification screen 700 such that the transmitter IDs 701 respectively correspond to the indicators 702. Taking 50 m, corresponding to the first threshold value As1(db), which is a relative distance from the antenna ANT1, as a reference value, the distance Dn is displayed in such a manner that the indicator 702 becomes longer as the distance Dn decreases with respect to the reference value (50 m). Thus, after confirming the notification screen 700, the person in charge of the window or the baggage deposit place can visually confirm the number of the users who are coming to the window to receive his or her baggage and the distances between the users and the window. Thus, if there are many users who are coming to the window, proper measures can be taken previously. For example, more staffs are assigned as a person in charge of the window, and thus jobs at the window can be performed more efficiently.

The layout of the notification screen 700 is not limited to that shown in FIG. 14. For example, the distance between a transmitter and the antenna ANT1 may be displayed as its actual value (digital value) but not displayed as an indicator (analog value). Further, an alarm ID associated with a transmitter ID other than a transmitter ID may be displayed.

Thus, according to the first embodiment, with the use of the transmitter 110 serving as a wireless device, the period of time required to hand over the baggage at the article checkroom is shortened and thus the baggage delivery job can be performed efficiently. Further, the baggage management apparatus 130 automatically checks the beacon signal sending function of a transmitter 110 when the transmitter 110 is handed over to a user. Similarly, the baggage management apparatus 130 automatically checks the beacon signal sending function of an alarm 120 which is attached to the baggage deposited by the user. In this way, the delivery of a transmitter 110 having a malfunction, which sends no beacon signal or a weak beacon signal, to the user is prevented, and the attachment of an alarm 120 having the malfunction to a baggage is also prevented. Thus, a high-efficient baggage delivery job can be practically performed.

(Second Embodiment)

Then, the second embodiment is described. The second embodiment is different from the first embodiment in a part of the procedures of the confirmation job and the deposit job.

First, the procedures of the confirmation job are described.

The confirmation job according to the second embodiment excludes the processing in Act 3 and Act6-Act 10 from that in the first embodiment. In FIG. 6, if an interrupt signal is detected in Act 1 (Act 1: Yes), the CPU 131 starts a built-in timer (Act 2). Then, the CPU 131 waits for the timeout of the timer (Act 4). Further, the CPU 131 determines whether or not a beacon signal is received (Act 5). If a beacon signal is received (Act 5: Yes) prior to the timeout of the timer (Act 4: No), the CPU 131 detects a transmitter ID from the beacon signal (Act 11). If no transmitter ID is detected (Act 11: No), the CPU 131 waits for the timeout of the timer (Act 4) or waits to receive the next beacon signal (Act 5).

If a transmitter ID is detected (Act 11: Yes), the CPU 131 carries out a tracking processing (Act 12). The tracking processing is identical to that described in the first embodiment and is therefore not described herein repeatedly. If the tracking processing is ended, the CPU 131 waits for the timeout of the timer (Act 4) or waits to receive the next beacon signal (Act 5).

Then, the procedures of the deposit job are described.

Procedures of the deposit job in the second embodiment are different from that in the first embodiment in that the processing in Act 26 and Act 27 which are carried out after the result of the determination of Act 24 is 'Yes' and the processing in Act 29 and Act 30 which are carried out after the result of the determination of Act 25 is 'Yes' in the first embodiment are replaced by the processing in Act 101-Act 107 shown in FIG. 15 in the second embodiment. The CPU 131 starts the built-in timer (Act 101) if it is determined in the processing in Act 24 or Act 25 that the barcode data is a transmitter ID or alarm ID. Further, the CPU 131 determines whether or not a beacon signal is received (Act 102). If no beacon signal is received (Act 102: No), the CPU 131 determines whether or not the timer takes timeout (Act 103). If the timer does not take timeout (Act 103: No), the CPU 131 returns to the processing in Act 102 to wait for a beacon signal.

If a beacon signal is received (Act 102: Yes), the CPU 131 detects a transmitter ID or an alarm ID from the beacon signal (Act 104). If no transmitter ID or alarm ID is detected (Act 104: No), the CPU 131 waits to receive a next beacon signal (Act 102).

If a transmitter ID or alarm ID is detected (Act 104: Yes), the CPU 131 determines whether or not the detected ID is identical to the transmitter ID or the alarm ID represented with the barcode data (Act 105). If the detected ID is not identical to the transmitter ID or the alarm ID represented with the barcode data (Act 105: No), the CPU 131 waits to receive a next beacon signal (Act 102).

If the detected ID is identical to the transmitter ID or the alarm ID represented by the barcode data (Act 105: Yes), the CPU 131 acquires the electric wave intensity An (db) detected by the intensity detection circuit 140 (Act 106). The CPU 131 determines whether or not the electric wave intensity An is greater than a threshold value A0 (Act 107). The threshold value A0 is the minimal value of the electric wave intensity acquired when the beacon signals sent from the plurality of transmitters 110 or alarms 120 prepared at the window of the article checkroom are received by the antenna ANT1. The minimal value (threshold value A0) is experimentally evaluated.

If the electric wave intensity An is greater than the threshold value A0 (Act 107: Yes), it is presumed that the source (sender) of the beacon signal is a plurality of transmitters 110 or alarms 120 prepared at the window of the article checkroom. In this case, the CPU 131 stores the ID (transmitter ID or alarm ID) detected from the beacon signal in the working memory WM1 or WM2 (Act 28 or 31). The subsequent procedures are identical to those in the first embodiment.

On the other hand, if the timer takes timeout without receiving a transmitter ID or alarm ID coincident with that shown with the barcode data (Act 103: Yes) or if the electric wave intensity An is equal to the threshold value A0 (Act 107: No), the transmitter 110 or the alarm 120 the barcode 121 of which is read is determined to be malfunction in a beacon signal sending function thereof. In this case, the CPU 131 notifies the malfunction of the transmitter 110 or alarm 120 (Act 38). The subsequent procedures are identical to those in the first embodiment.

The second embodiment with the foregoing structure also achieves the same effect as achieved by the first embodiment. Further, the second embodiment has an advantage in that the ID buffer 300 is not needed.

The present invention is not limited to the foregoing embodiments.

For example, in the foregoing embodiments, in the deposit job, the deposit registration button 603 is enabled when a deposit registration processing is executed, and the deposit cancellation button 604 is enabled when a deposit cancellation processing is executed. In this regard, it is also applicable that the deposit registration button 603 is displayed on the ID confirmation screen 600 when a deposit registration processing is executed and the deposit cancellation button 604 is displayed on the ID confirmation screen 600 when a deposit cancellation processing is executed. Although the deposit registration button 603 and the deposit cancellation button 604 are always enabled, it may be set that an error in operation is displayed if the deposit cancellation button 604 is operated in the deposit registration processing or if the deposit registration button 603 is operated in the deposit cancellation processing.

Further, in the foregoing embodiments, electric wave reception intensity is compared with a threshold value. As to this point, the electric wave reception intensity may be converted to a distance data, and the distance data may be compared with a threshold value. Further, a confirmation method in which whether or not the relative distance between the transmitter 110 and the antenna ANT1 is within a specific distance is determined is not limited to the method which uses the electric wave reception intensity. It is sufficient that the relative distance between the transmitter 110 and the antenna ANT1 can be evaluated with a method.

Further, in the foregoing embodiments, a first wireless unit 139A and a second wireless unit 139B are arranged; however, the wireless units maybe integrated. In this case, with the use of an existing communication method such as Bluetooth (Registered Trademark), the communication between the wireless unit and a transmitter 110 is set as unidirectional communication and that between the wireless unit and the alarm 120 as bidirectional communication. Further, to guarantee a long-distance communication with the transmitter 110, a diversity antenna is used as the antenna ANT1.

Further, it is exemplified in the foregoing embodiments that the reception of the deposit of an article and the delivery of the deposited article are executed at the same window, however, the reception of the deposit of an article and the delivery of the deposited article are not necessarily executed at the same window. For example, the deposit of an article may be received at a window located at a place A and the deposited article is handed over to the user at a window located at a place B different from the place A.

Further, the article management apparatus is typically delivered in a state in which a program such as an application program stored in an ROM. However, the delivery of the article management apparatus is not limited to this; a program which is delivered in other way other than that of the computer may be written into a writable memory device of the computer. The program is delivered by being recorded in a removable recording medium or through a network communication. The recording medium may be in any form as long as the recording medium is capable of storing programs and readable to the apparatus like a CD-ROM or memory card. Further, the functions achieved by an installed or downloaded program can also be achieved through the cooperation with an OS (Operating System) in an apparatus.

While certain embodiments have been described, these embodiments have been presented byway of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. An article management system comprising:
   a transmitter configured to send an electric wave that comprises a transmitter ID, wherein the transmitter is provided to a user that deposits an article;
   an alarm configured to carry out a notification operation in response to an input of a drive signal, wherein the alarm is attached to the article and transmits another electric wave that comprises an alarm ID;
   a receiver configured to receive the electric wave from the transmitter and the another electric wave from the alarm;
   a reader configured to input the transmitter ID and the alarm ID; and
   an article management apparatus including,
      a processor configured to associate the transmitter ID with the alarm ID which corresponds to the article to be handed over to a user who has the transmitter on condition that the electric wave sent from the transmitter and the another electric wave sent from the alarm are being received by the receiver,
      the processor is also configured to determine whether or not a relative distance between the transmitter and the receiver becomes shorter than a specific distance on condition that the transmitter ID that is associated with the alarm ID are received by the receiver and to output the drive signal to the alarm, wherein the alarm transmits the another electric wave if the relative distance is shorter than the specific distance.

2. The article management system according to claim 1, wherein the processor associates the transmitter with the alarm corresponding to the article to be handed over to the user who carries the transmitter on condition that the receiver receives the electric wave an intensity of which is greater than a specific value from the transmitter.

3. The article management system according to claim 1, wherein the transmitter periodically sends the electric wave containing the transmitter ID and the receiver receives the electric wave containing the transmitter ID sent from the transmitter located in a specific communication area.

4. The article management system according to claim 2, wherein the transmitter periodically sends the electric wave containing the transmitter ID and the receiver receives the electric wave containing the transmitter ID sent from the transmitter located in a specific communication area.

5. The article management system according to claim 3, further comprising:
   an input device configured to input the transmitter ID contained in the electric wave sent from the transmitter, wherein
   the processor associates the transmitter with the alarm corresponding to the article to be handed over to the user who carries the transmitter on condition that the receiver receives the electric wave containing the transmitter ID input through the input device.

6. An article management apparatus, comprising:
   a processor configured to associate a transmitter with an alarm which corresponds to an article to be handed over to a user who has the transmitter on condition that an electric wave sent from the transmitter and another electric wave sent by the alarm are being received by a receiver, wherein the electric wave comprises a transmitter ID and the another electric wave comprises an alarm ID,
   wherein the processor is further configured to determine whether or not a relative distance between the transmitter and the receiver becomes shorter than a specific distance on condition that the electric wave sent from the transmitter and the another electric wave sent from the alarm are being received by the receiver and to output a drive signal to the alarm which is associated with the transmitter if the relative distance is shorter than the specific distance, wherein the drive signal comprises an instruction for the alarm to transmit the another electric wave.

7. A method for managing an article, including:
   reading a transmitter ID associated with transmitter and an alarm ID associated with an alarm;
   associating the transmitter with the alarm which corresponds to an article to be handed over to a user who has the transmitter on condition that an electric wave sent from the transmitter and another electric wave sent from the alarm is being received by a receiver, wherein the electric wave comprises the transmitter ID and the another electric wave comprises the alarm ID;
   determining whether or not a relative distance between the transmitter and the receiver becomes shorter than a specific distance on condition that the electric wave sent from the transmitter and the another electric wave sent from the alarm are being received by the receiver; and
   outputting a drive signal to the alarm which is associated with the transmitter if the relative distance is shorter than the specific distance, wherein the drive signal causes a transmission of the another electric wave.

8. The article management system according to claim 1, further comprising an ID buffer for storing the transmitter ID and the alarm ID received by the receiver,
   wherein the article management system associates the transmitter ID and the alarm ID with each other on condition that the transmitter ID and the alarm ID that are input via the reader are stored in the ID buffer.

9. The article management system according to claim 1, wherein the article management system associates the transmitter ID and the alarm ID to each other on condition that a timer is activated after the transmitter ID is input via the reader, and the transmitter ID is received by the receiver prior to a timeout of the timer, and the timer is activated after the alarm ID is input via the reader, and the alarm ID is received by the receiver prior to the timeout of the timer.

* * * * *